US012695028B2

(12) United States Patent
Oh et al.

(10) Patent No.: US 12,695,028 B2
(45) Date of Patent: Jul. 28, 2026

(54) INNER ELECTRODE MATERIAL FOR MULTILAYERED CAPACITOR AND MULTILAYERED CAPACITOR COMPRISING THE SAME

(71) Applicant: SAMSUNG ELECTRO-MECHANICS CO., LTD., Suwon-si (KR)

(72) Inventors: Youngjoon Oh, Suwon-si (KR); Hyunwoong Na, Suwon-si (KR); Youngkyu Park, Suwon-si (KR); Kyoungki Min, Suwon-si (KR); Seongmin Park, Suwon-si (KR); Seula Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 239 days.

(21) Appl. No.: 18/614,040

(22) Filed: Mar. 22, 2024

(65) Prior Publication Data

US 2024/0347272 A1 Oct. 17, 2024

(30) Foreign Application Priority Data

Apr. 13, 2023 (KR) ........................ 10-2023-0048595
Oct. 27, 2023 (KR) ........................ 10-2023-0145895

(51) Int. Cl.
*H01G 4/008* (2006.01)
*H01G 4/012* (2006.01)
(Continued)

(52) U.S. Cl.
CPC ............. *H01G 4/0085* (2013.01); *H01G 4/30* (2013.01); *H01G 4/012* (2013.01); *H01G 4/1227* (2013.01)

(58) Field of Classification Search
CPC ........ H01G 4/30; H01G 4/012; H01G 4/1227; H01G 4/0085; H01G 4/005; H01G 4/008
(Continued)

(56) References Cited

U.S. PATENT DOCUMENTS

2003/0044610 A1* 3/2003 Hosokura ................ H01G 4/30
428/209
2010/0236937 A1* 9/2010 Rosvall .................... C25B 1/26
205/334
(Continued)

FOREIGN PATENT DOCUMENTS

CN 108172337 A 6/2018
CN 111952074 A * 11/2020 ............... H01G 4/30
(Continued)

OTHER PUBLICATIONS

Notice of Allowance dated Dec. 2, 2024, issued in corresponding Korean Patent Application No. 10-2023-0145895 with an English translation.
(Continued)

*Primary Examiner* — Arun Ramaswamy
(74) *Attorney, Agent, or Firm* — Morgan, Lewis & Bockius LLP

(57) ABSTRACT

A multilayered capacitor includes a capacitor body including a dielectric layer and an inner electrode, and an external electrode disposed outside the capacitor body, in which the inner electrode includes a compound represented by the following Chemical Formula 1, and the compound has a Brunauer-Emmett-Teller (BET) specific surface area of 1.0 to 2.2 m²/g:

$$M1_{a+1}M2M3_a$$ [Chemical Formula 1]

(Continued)

(in Chemical Formula 1, M1 is Ti, V, Sc, Zr or Mo, M2 is Al, Si, Sn, Cd, In, Ga, Ge, Pb, As, S or P, M3 is C or N, a is 1 to 3).

11 Claims, 4 Drawing Sheets

(51) Int. Cl.
*H01G 4/12* (2006.01)
*H01G 4/30* (2006.01)

(58) Field of Classification Search
USPC .................................... 361/301.4, 303, 321.1
See application file for complete search history.

(56) References Cited

U.S. PATENT DOCUMENTS

2013/0082575 A1     4/2013   Kang et al.
2014/0290863 A1*   10/2014   Watanabe ............... H10P 72/72
                                                                    156/345.52

FOREIGN PATENT DOCUMENTS

KR      10-2013-0036596  A      4/2013
KR      10-2014-0090754  A      7/2014
KR      10-2021-0054332  A      5/2021
KR      10-2021-0061776  A      5/2021

OTHER PUBLICATIONS

G. Ya, Khadzhai, et al., "Electrical and thermal conductivity of the Ti3AlC2 MAX phase at low temperatures, Low Temperature Physics," vol. 44, pp. 451-452 (2018).

T. J. Rudzik, et al., "Comparison of hot pressing and spark plasma sintering in the densification behavior of indium tin oxide-borosilicate glass composites," Journal of the American Ceramic Society, vol. 101, pp. 577-589 (2018).

Y. Pang, et al., "Investigation of electrical conductivity and oxidation behavior of TiC and TiN based cermets for SOFC interconnect application," ECS Transactions, vol. 7, pp. 2427-2435 (2007).

A. Ignaszak, et al., "Titanium carbide and its core-shelled derivative TiC@ TiO2 as catalyst supports for proton exchange membrane fuel cells," Electrochimica acta, vol. 69, pp. 397-405(2012).

A. Mansour, "Structural analysis of planar sp3 and sp2 films: Diamond-like carbon and graphene overlayers," Ph.D. Thesis (2011).

Korean Office Action dated Sep. 26, 2024 issued in Korean Patent Application No. 10-2023-0145895 (with English translation).

Z. Zhao, et al., "Ti2A1C bulk ceramics produced by gelcasting and A1-rich pressureless sintering," Ceramics International, vol. 46, 2020, pp. 14767-14775.

* cited by examiner

【FIG. 1】
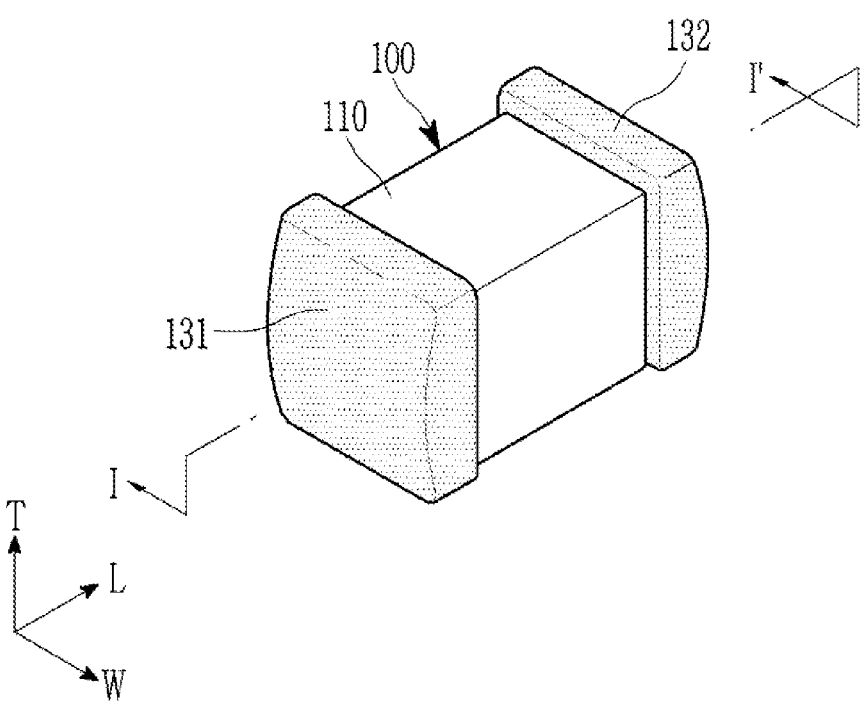

【FIG. 2】
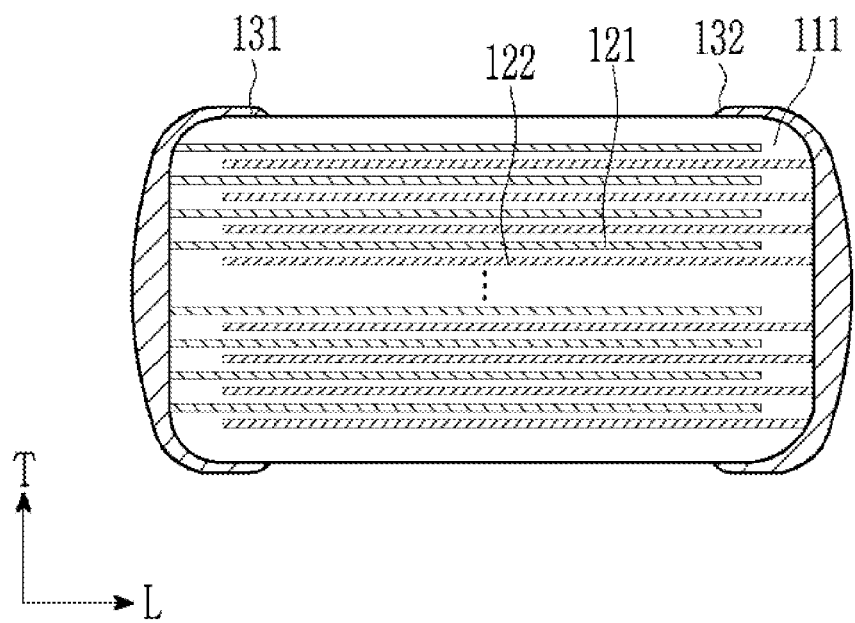

【FIG. 3】
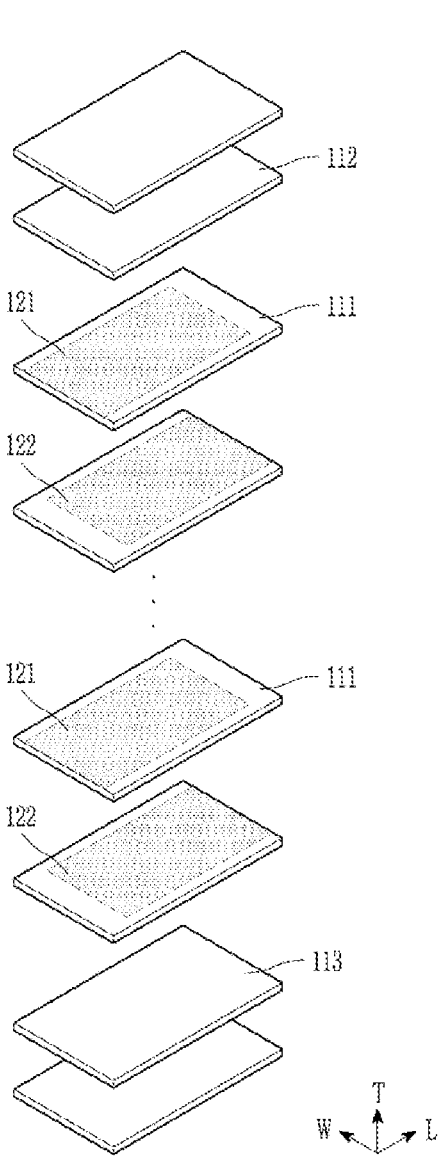

【FIG. 4】
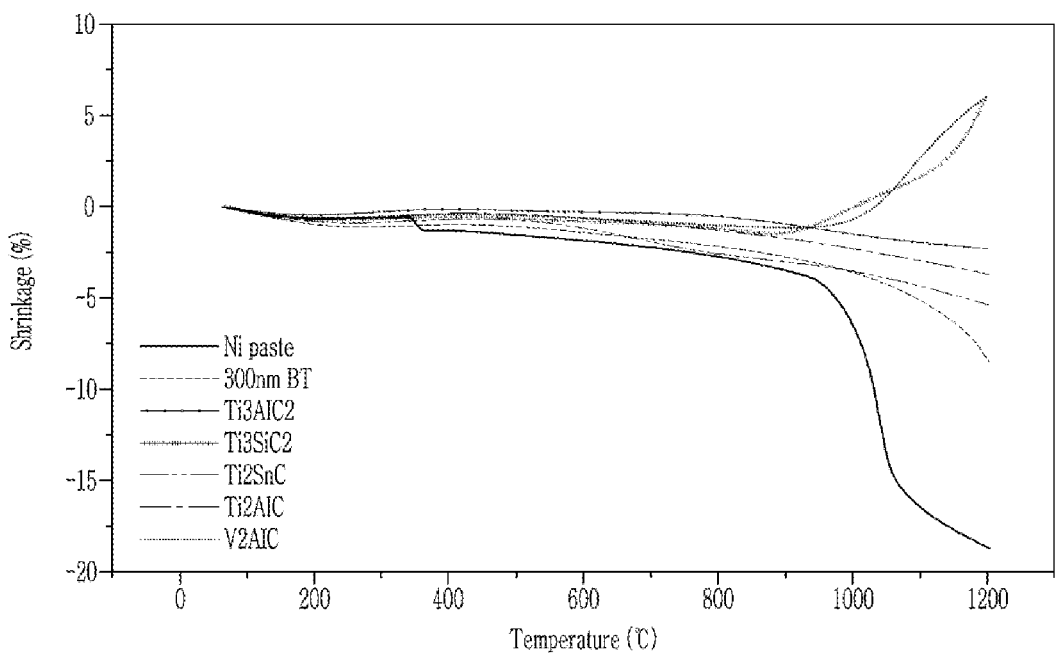

INNER ELECTRODE MATERIAL FOR MULTILAYERED CAPACITOR AND MULTILAYERED CAPACITOR COMPRISING THE SAME

CROSS-REFERENCE TO RELATED APPLICATION

This application claims the benefit of priority to Korean Patent Application No. 10-2023-0048595, filed on Apr. 13, 2023 in the Korean Intellectual Property Office, and Korean Patent Application No. 10-2023-0145895, filed on Oct. 27, 2023 in the Korean Intellectual Property Office, the entire contents of which are incorporated herein by reference.

TECHNICAL FIELD

The present disclosure relates to an inner electrode material for a multilayered capacitor and a multilayered capacitor comprising the same.

BACKGROUND

A multilayered ceramic capacitor (MLCC), one of the capacitor components, is a chip-shaped condenser mounted on the printed circuit boards of various electronic products such as display devices, liquid crystal displays (LCDs), plasma display panels (PDPs) and the like, for example, as well as computers, smartphones, mobile phones, and the like, to serve to charge and discharge electricity therein.

Since such a multilayered ceramic capacitor has advantages such as a small size, high capacitance, ease of mounting, such a such a multilayered ceramic capacitor may be used as a component in various electronic devices.

The multilayered ceramic capacitor includes inner electrodes in dielectric ceramic. In addition, a multilayered ceramic capacitor may be manufactured by stacking a conductive paste including an inner electrode material and a ceramic green sheet including ceramic powder using a sheet method, or a printing method, and simultaneously firing the same.

At this time, nickel (Ni) powder is commonly used as the inner electrode material, and $BaTiO_3$ is mainly used as the dielectric ceramic powder. However, in order to form dielectric layers, the ceramic green sheet may be fired at a high temperature of about 1100° C. or higher, and the conductive paste may be sintered and contracted at a lower temperature. Accordingly, while the ceramic green sheet is being fired, inner electrode layers may be excessively fired. And as a result, issues such as cracks or delamination may occur in the inner electrode. This deteriorates the performance of the multilayered ceramic capacitor.

To solve the above issue, attempts were made to control high-temperature sintering shrinkage by adding silicon dioxide ($SiO_2$) or nano barium titanate ($BaTiO_3$) to the conventional inner electrode conductive paste, or by using a metal such as tungsten (W). However, since silicon dioxide or barium titanate is a nonconductor, the electrical conductivity of the electrode may deteriorate, and there is an issue that additional processes and additional costs due to additives occur.

In addition, when nickel powder is fired to manufacture a capacitor, the firing atmosphere must be adjusted to a reducing atmosphere, but there is an issue of increased process costs when the firing is performed in a reducing atmosphere.

The information disclosed in the Background section above is to aid in the understanding of the background of the present disclosure, and should not be taken as acknowledgement that this information forms any part of prior art.

SUMMARY

The present disclosure is directed to providing a new inner electrode material for a multilayered capacitor capable of suppressing sintering shrinkage without a separate additive during the firing process for manufacturing a capacitor, and capable of being fired even in an oxidizing atmosphere, and a multilayered capacitor including the same.

An embodiment of the present disclosure provides an inner electrode material for a multilayered capacitor including a compound represented by the following Chemical Formula 1 and having a Brunauer-Emmett-Teller (BET) specific surface area of 1.0 to 2.2 $m^2$/g:

$$M1_{a+1}M2M3_a \qquad \text{[Chemical Formula 1]}$$

(in Chemical Formula 1, M1 is Ti, V, Sc, Zr or Mo, M2 is Al, Si, Sn, Cd, In, Ga, Ge, Pb, As, S or P, M3 is C or N, a is 1 to 3).

In Chemical Formula 1, M1 may be Ti or V, M2 may be Al, Si or Sn, and M3 may be C.

The compound may be $Ti_3AlC_2$, $Ti_2AlC$, $V_2AlC$, $Ti_3SiC_2$ or $Ti_3SnC_{2-}$.

The compound may have an average particle diameter (D50) of 400 to 700 nm.

The compound may have a volume reduction rate of 5% or less at a temperature of 1100° C. compared to a volume reduction rate at a temperature of 800° C. when analyzed by thermomechanical analyzer (TMA).

The compound may have an electrical conductivity of $1.05 \times 10^6$ S/m or more.

Another embodiment of the present disclosure provides a multilayered capacitor, including: a capacitor body including a dielectric layer and an inner electrode; and an external electrode disposed outside the capacitor body, wherein the inner electrode includes a compound represented by the following Chemical Formula 1, and the compound has a Brunauer-Emmett-Teller (BET) specific surface area of 1.0 to 2.2 $m^2$/g:

$$M1_{a+1}M2M3_a \qquad \text{[Chemical Formula 1]}$$

(in Chemical Formula 1, M1 is Ti, V, Sc, Zr or Mo, M2 is Al, Si, Sn, Cd, In, Ga, Ge, Pb, As, S or P, M3 is C or N, a is 1 to 3).

In Chemical Formula 1, M1 may be Ti or V, M2 may be Al, Si or Sn, and M3 may be C.

The compound may be $Ti_3AlC_2$, $Ti_2AlC$, $V_2AlC$, $Ti_3SiC_2$ or $Ti_3SnC_2$.

The compound may have an average particle diameter (D50) of 400 to 700 nm.

The compound may have a volume reduction rate of 5% or less at a temperature of 1100° C. compared to a volume reduction rate at a temperature of 800° C. when analyzed by thermomechanical analyzer (TMA).

The compound may have an electrical conductivity of $1.05 \times 10^6$ S/m or more.

The inner electrode may not include nickel (Ni), barium titanate ($BaTiO_3$), silicon dioxide ($SiO_2$), or tungsten (W).

The dielectric layer may include a plurality of dielectric crystal grains, and the dielectric crystal grains may include $Ba_mTiO_3$ (0.995≤m≤1.010) as a main component, and hafnium (Hf), manganese (Mn), chromium (Cr), silicon (Si), aluminum (Al), magnesium (Mg), tin (Sn), antimony (Sb), germanium (Ge), gallium (Ga), indium (In), or a combination thereof as an accessory component.

Still another embodiment of the present disclosure provides a method of manufacturing a multilayered capacitor, including: forming a dielectric green sheet using dielectric powder; forming a conductive paste layer on the surface of the dielectric green sheet including a compound represented by the following Chemical Formula 1 and having a Brunauer-Emmett-Teller (BET) specific surface area of 1.0 to 2.2 $m^2/g$; forming a dielectric green sheet laminate by stacking the dielectric green sheets on which the conductive paste layer is formed; forming a capacitor body including a dielectric layer and an inner electrode by firing the dielectric green sheet laminate in an oxidizing atmosphere; and forming an external electrode on one surface of the capacitor body.

The oxidizing atmosphere may be air or oxygen ($O_2$) atmosphere.

The firing may be performed using a hot press method.

The conductive paste layer may not include nickel (Ni), barium titanate ($BaTiO_3$), silicon dioxide ($SiO_2$), and tungsten (W).

The inner electrode material for a multilayered capacitor is capable of suppressing sintering shrinkage without a separate additive during the firing process for manufacturing a capacitor, and is capable of being fired even in an oxidizing atmosphere. In addition, it is possible to implement electrical conductivity similar to or more improved than nickel, which was commonly used as a conventional inner electrode material.

Accordingly, it is possible to reduce the manufacturing cost of capacitors while improving the performance of the capacitors.

BRIEF DESCRIPTION OF THE DRAWINGS

FIG. 1 is a perspective view of a multilayered capacitor according to an embodiment of the present disclosure.

FIG. 2 is a cross-sectional view of the multilayered capacitor taken along I-I' line of FIG. 1.

FIG. 3 is an exploded perspective view illustrating the stacked structure of an inner electrode in a capacitor body of FIG. 1.

FIG. 4 is a graph of thermomechanical analyzer (TMA) analysis results according to Experimental Example 1.

DETAILED DESCRIPTION OF THE EMBODIMENTS

Hereinafter, the present disclosure will be described in detail hereinafter with reference to the accompanying drawings, in which embodiments of the present disclosure are shown. The drawings and description are to be regarded as illustrative in nature and not restrictive. Like reference numerals designate like elements throughout the specification. The accompanying drawings are intended only to facilitate an understanding of the exemplary embodiments disclosed in this specification, and it is to be understood that the technical ideas disclosed herein are not limited by the accompanying drawings and include all modifications, equivalents, or substitutions that are within the range of the ideas and technology of the present disclosure.

Although terms of "first," "second," and the like are used to explain various constituent elements, the constituent elements are not limited to such terms. These terms are only used to distinguish one constituent element from another constituent element.

When it is mentioned that a certain component is "coupled with" or "connected with" another component, it may be understood that another component can exist between the two components although the component can be directly coupled or connected with another component. Meanwhile, when it is mentioned that a certain component is "directly coupled with" or "directly connected with" another component, it has to be understood that another component does not exist between the two components.

Throughout the specification, the terms "comprise" or "have" are intended to specify the presence of stated features, integers, steps, operations, constituent elements, components or a combination thereof, but do not preclude the presence or addition of one or more other features, integers, steps, operations, constituent elements, components, and/or groups thereof. Therefore, unless explicitly described to the contrary, the term "comprise" and variations such as "comprises" or "comprising" will be understood to imply the inclusion of stated elements but not the exclusion of any other elements.

FIG. 1 is a perspective view of a multilayered capacitor according to an embodiment of the present disclosure.

FIG. 2 is a cross-sectional view of the multilayered capacitor taken along I-I' line of FIG. 1.

FIG. 3 is an exploded perspective view illustrating the stacked structure of an inner electrode in a capacitor body of FIG. 1.

When defining directions to clearly explain the present embodiment, the L-axis, W-axis, and T-axis shown in the drawing represent the length direction, width direction, and thickness direction of a capacitor body 110, respectively. Here, the thickness direction (T-axis direction) may be a direction perpendicular to the wide surface (main surface) of the sheet-shaped components, and may be used as the same concept as a stacking direction in which a dielectric layer 111 is stacked, for example. The longitudinal direction (L-axis direction) may be a direction extending parallel to the wide surface (main surface) of the sheet-shaped components, and may be approximately perpendicular to the thickness direction (T-axis direction). For example, the longitudinal direction (L-axis direction) may be the direction in which an external electrode 131 and a second external electrode 132 are positioned. The width direction (W-axis direction) may be a direction extending parallel to the wide surface (main surface) of the sheet-shaped components, and may be approximately perpendicular to the thickness direction (T-axis direction) and the longitudinal direction (L-axis direction). The length of the sheet-shaped components in the longitudinal direction (L-axis direction) may be longer than the length in the width direction (W-axis direction).

Referring to FIGS. 1 to 3, a multilayered ceramic capacitor 100 according to an embodiment of the present disclosure may include the capacitor body 110, and a first external electrode 131 and a second external electrode 132 disposed at both ends opposing in the longitudinal direction (L-axis direction) of the capacitor body 110.

For example, the capacitor body 110 may have a roughly hexahedral shape.

For convenience of description of the present embodiment, the two surfaces opposing each other in the thickness direction (T-axis direction) of the capacitor body 110 are referred to as first and second surfaces, the two surfaces connected to the first and second surfaces and opposing each other in the longitudinal direction (L-axis direction) are referred to as third and fourth surfaces, and two surfaces connected to the first and second surfaces and to the third and fourth surfaces, and opposing each other in the width direction (W-axis direction) are referred to as fifth and sixth surfaces.

As an example, the first surface, which is the lower surface, may be a surface facing the mounting direction. Additionally, the first to sixth surfaces may be flat, but the embodiment is not limited thereto. For example, the first to sixth surfaces may be curved surfaces with a convex central portion, and the edges, which are the boundaries of each surface, may be rounded.

The shape and size of the capacitor body 110 and the number of stacks of the dielectric layers 111 are not limited to those shown in the drawings of the embodiment.

The capacitor body 110 is a plurality of dielectric layers 111 stacked in the thickness direction (T-axis direction) and then fired, and includes a first inner electrode 121 and a second inner electrode 122 alternately arranged in the thickness direction (T-axis direction) with the plurality of dielectric layers 111 interposed therebetween.

At this time, the boundaries between adjacent dielectric layers 111 of the capacitor body 110 may be integrated to the extent that it is difficult to check without using a scanning electron microscope (SEM).

Additionally, the capacitor body 110 may include an active region and cover regions 112 and 113.

The active region is a portion that contributes to forming the capacitance of the multilayered capacitor 100. For example, the active region may be an region where the first inner electrode 121 or the second inner electrode 122 stacked along the thickness direction (T-axis direction) overlap.

The cover region 112 and 113 are thickness direction margin portions, and may be located on the first and second surfaces of the active region in the thickness direction (T-axis direction), respectively. These cover regions 112 and 113 may be a single dielectric layer 111 or two or more dielectric layers 111 stacked on the upper and lower surfaces of the active region, respectively.

Additionally, the capacitor body 110 may further include a side cover region. The side cover region is a width direction margin portion, and may be located on the fifth and sixth surfaces of the active portion in the width direction (W-axis direction), respectively. The side cover region may be formed by applying a conductive paste layer for the inner electrode on the surface of the dielectric green sheet, applying the conductive paste layer on only a part of the surface of the dielectric green sheet, and not applying the conductive paste layer on both sides of the surface of the dielectric green sheet, and then stacking the dielectric green sheets.

The cover regions 112 and 113 and the side cover region serve to prevent damage to the first inner electrode 121 and the second inner electrode 122 due to physical or chemical stress.

At this time, the inner electrode according to the present disclosure includes a compound represented by the following Chemical Formula 1 as an inner electrode material:

$$M1_{a+1}M2M3_a \qquad \text{[Chemical Formula 1]}$$

(in Chemical Formula 1, M1 is Ti, V, Sc, Zr or Mo, M2 is Al, Si, Sn, Cd, In, Ga, Ge, Pb, As, S or P, M3 is C or N, a is 1 to 3).

As will be described later, a multilayered ceramic capacitor may be manufactured by stacking a conductive paste including an inner electrode material and a ceramic green sheet including ceramic powder using a sheet method, or a printing method, and simultaneously firing the same.

Conventionally, nickel (Ni) powder was commonly used as an inner electrode material, and $BaTiO_3$ was mainly used as a dielectric ceramic powder. However, in order to form dielectric layers, the ceramic green sheet may be fired at a high temperature of about 1100° C. or higher, while the conductive paste may be sintered and contracted at a lower temperature. Accordingly, while the ceramic green sheet is being fired, inner electrode layers may be excessively fired. And as a result, issues such as cracks or delamination may occur in the inner electrode. This deteriorates the performance of the multilayered ceramic capacitor.

To solve the above issue, attempts were made to control high-temperature sintering shrinkage by adding silicon dioxide ($SiO_2$) or nano barium titanate ($BaTiO_3$) to the conventional inner electrode conductive paste, or by using a metal such as tungsten (W). However, since silicon dioxide or barium titanate is a nonconductor, the electrical conductivity of the electrode may deteriorate, and there is an issue that additional processes and additional costs due to additives occur.

In addition, when nickel powder is fired to manufacture a capacitor, the firing atmosphere must be adjusted to a reducing atmosphere, but there is an issue of increased process costs when fired in a reducing atmosphere.

On the other hand, the inner electrode according to the present disclosure includes the compound represented by Chemical Formula 1 above as an inner electrode material, so that the sintering shrinkage temperature may be significantly increased, and the sintering shrinkage rate at high temperature may be reduced without the use of separate additives. Accordingly, cracks or delamination of the inner electrodes may be prevented, thereby preventing performance degradation of the multilayered capacitor.

In addition, the compound represented by Chemical Formula 1 may be fired even in an oxidizing atmosphere during the firing process for manufacturing a capacitor. Accordingly, there may be an advantage in reducing process costs because there is no need to input reducing gas.

In addition, the compound represented by Chemical Formula 1 may have ionic conductivity equivalent to that of conventional nickel (Ni) or may be further improved. Therefore, unlike the conventional nickel inner electrode, the inner electrode according to the present disclosure does not require a separate additive to control sintering shrinkage, and thus the inner electrode may be implemented without deterioration in electrical conductivity, thereby providing excellent electrical conductivity.

Accordingly, the compound may have a volume reduction rate of 5% or less at a temperature of 1100° C. compared to a volume reduction rate at a temperature of 800° C. when analyzed by thermomechanical analyzer (TMA).

Further, the compound may have an electrical conductivity of $1.05 \times 10^6$ S/m or more, and more specifically, $1.5 \times 10^6$ S/m, $2.0 \times 10^6$ S/m, $2.5 \times 10^6$ S/m, $3.0 \times 10^6$ S/m, $3.5 \times 10^6$ S/m or more.

Specifically, in Chemical Formula 1, M1 may be Ti or V, M2 may be Al, Si, or Sn, and M3 may be C. More specifically, the compound may be $Ti_3AlC_2$, $Ti_2AlC$, $V_2AlC$, $Ti_3SiC_2$ or $Ti_3SnC_2\_$. When the compound is represented by Chemical Formula 1, the effects of high-temperature sintering shrinkage suppression and ionic conductivity enhancement mentioned above may be more preferably implemented.

Additionally, the compound represented by Chemical Formula 1 may have a Brunauer-Emmett-Teller (BET) specific surface area of 1.0 to 2.2 m²/g, and more specifically, 1.2 to 2.1 m²/g. If the BET specific surface area of the compound represented by Chemical Formula 1 is too small, there may be issues such as an increase in the thickness and of the inner electrode and a deterioration in electrical conductivity. If the BET specific surface area of the compound represented by Chemical Formula 1 is too large, there may be issues such as deteriorated connectivity and deteriorated density due to particle aggregation.

In this specification, "BET specific surface area" may be measured using the BET method (Surface area and Porosity analyzer) (Micromeritics, ASAP2020).

In addition, the average particle diameter (D50) of the compound represented by Chemical Formula 1 may be 400 to 700 nm. If the average particle diameter of the compound represented by Chemical Formula 1 is too small, there may be an issue of particle agglomeration. If the average particle diameter of the compound represented by Chemical Formula 1 is too large, there may be an issue of increasing the inner electrode thickness.

In this specification, the "average particle diameter (D50)" may be defined as the particle diameter corresponding to 50% of the cumulative volume in the particle diameter distribution curve. The average particle diameter (D50) may be measured using, for example, a laser diffraction method. The laser diffraction method is generally capable of measuring particle diameter ranging from the submicron region to several millimeters, and may obtain results with high reproducibility and high resolution.

Meanwhile, the inner electrode may not include nickel (Ni). That is, the inner electrode material according to the present disclosure may be used as the main inner electrode material, rather than as an additive or supplement to the conventional nickel-containing inner electrode.

Additionally, the inner electrode may not include barium titanate ($BaTiO_3$), silicon dioxide ($SiO_2$), or tungsten (W). That is, the inner electrode according to the present disclosure may not contain a separate additive for controlling the high-temperature sintering shrinkage of conventional nickel by using the compound of Chemical Formula 1 as the inner electrode material. Accordingly, it is possible to prevent a deterioration in electrical conductivity due to the use of additives and reduce processing costs.

Meanwhile, the dielectric layer 111 may include a plurality of dielectric crystal grains 1111.

The dielectric crystal grain 1111 may include main components and accessory components.

The main components may be dielectric material including $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), $(Ba_{1-x}Ca_x)_m(Ti_{1-y}Sn_y)O_3$ ($0.995 \leq m \leq 1.010$, $0 \leq x \leq 0.10$, $0 < y \leq 0.20$), or combination thereof.

The accessory components may include hafnium (Hf), manganese (Mn), chromium (Cr), silicon (Si), aluminum (Al), magnesium (Mg), tin (Sn), antimony (Sb), germanium (Ge), gallium (Ga), indium (In), or a combination thereof.

In addition, the accessory components may further include lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or a combination thereof.

For example, the average thickness of the dielectric layer 111 may be 0.5 μm to 10 μm.

Meanwhile, the first inner electrode 121 and the second inner electrode 122 are electrodes having different polarities, which are alternately arranged opposite each other along the T-axis direction with the dielectric layer 111 interposed therebetween, and one end of the first inner electrode 121 and the second inner electrode 122 may be exposed through the third and fourth surfaces of the capacitor body 110, respectively.

The first inner electrode 121 and the second inner electrode 122 may be electrically insulated from each other by the dielectric layer 111 disposed in the middle.

The ends of the first inner electrode 121 and the second inner electrode 122, which are alternately exposed through the third and fourth surfaces of the capacitor body 110, may be connected and electrically connected with the first external electrode 131 and the second external electrode 132, respectively.

The first inner electrode 121 and the second inner electrode 122 may be formed using a conductive paste including a conductive metal. The printing method of the conductive paste may be a screen-printing method or a gravure printing method.

For example, the average thickness of the first inner electrode 121 and the second inner electrode 122 may be 0.1 μm to 2 μm.

The first external electrode 131 and the second external electrode 132 are provided with voltages of different polarities and may be electrically connected with exposed portions of the first inner electrode 121 and the second inner electrode 122, respectively.

According to the above configuration, when a predetermined voltage is applied to the first external electrode 131 and the second external electrode 132, charges are accumulated between the opposing first inner electrode 121 and the second inner electrode 122. At this time, the capacitance of the multilayered ceramic capacitor 100 is proportional to the overlapped area of the first inner electrode 121 and the second inner electrode 122, which are overlap each other along the T-axis direction in the active region.

The first external electrode 131 and the second external electrode 132 may each include first and second connection portions respectively disposed on the third and fourth surfaces of the capacitor body 110 to connect with the first inner electrode 121 and the second inner electrode 122, and first and second band portions disposed at the corners where the third and fourth surfaces or the fifth and sixth surfaces of the capacitor body 110 meet.

The first and second band portions may extend from the first and second connection portions to parts of the first and second surfaces or the fifth and sixth surfaces of the capacitor body 110, respectively. The first and second band portions may serve to improve the adhesion strength of the first external electrode 131 and the second external electrode 132.

For example, the first external electrode 131 and the second external electrode 132 may each include a sintered metal layer in contact with the capacitor body 110, a conductive resin layer disposed to cover the sintered metal layer, and a plating layer disposed to cover the conductive resin layer.

The sintered metal layer may include conductive metal and glass.

For example, the sintered metal layer may include conductive metal such as copper (Cu), nickel (Ni), silver (Ag), palladium (Pd), gold (Au), platinum (Pt), tin (Sn), tungsten (W), and titanium (Ti), lead (Pb), an alloy thereof, or a combination thereof. For example, copper (Cu) may include a copper (Cu) alloy. When the conductive metal includes copper, metals other than copper may be included in an amount of 5 parts by mole or less based on 100 parts by mole of copper.

For example, the sintered metal layer may include a composition of glass mixed with oxides, for example, one or more selected from the group consisting of silicon oxide, boron oxide, aluminum oxide, transition metal oxide, alkali metal oxide, and alkaline earth metal oxide. The transition metal is selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline earth metal may be one or more selected from the group consisting of magnesium (Mg), calcium (Ca), strontium (Sr), and barium (Ba).

The content of the conductive metal and glass in the sintered metal layer is not particularly limited, but for example, the average area of the conductive metal in the cross-section (L-axis direction and T-axis direction cross-section) perpendicular to the thickness direction (W-axis direction) of the multilayered capacitor 100 may be 30% to 90%, or 70% to 90% of the entire area of the sintered metal layer.

According to an embodiment of the present disclosure, the conductive resin layer is formed on the sintered metal layer, for example, may be formed to completely cover the sintered metal layer. Meanwhile, the first external electrode 131 and the second external electrode 132 may not include a sintered metal layer. In this case, the conductive resin layer may be in direct contact with the capacitor body 110.

The conductive resin layer extends to the first and second surfaces or the fifth and sixth surfaces of the capacitor body 110, and the length of the region (i.e., band portion) where the conductive resin layer is extended and disposed to the first and second surfaces or the fifth and sixth surfaces of the capacitor body 110 may be longer than the length of the region (i.e., band portion) where the sintered metal layer is extended and disposed to the first and second surfaces or the fifth and sixth surfaces of the capacitor body 110. That is, the conductive resin layer is formed on the sintered metal layer and may be formed to completely cover the sintered metal layer.

The conductive resin layer includes resin and conductive metal.

The resin included in the conductive resin layer may be implemented by a material which has adhesive properties and shock absorption properties and is able to form a paste when mixed with the conductive metal powder, but is not limited thereto. For example, the resin may include phenolic resin, acrylic resin, silicone resin, epoxy resin, or polyimide resin.

The conductive metal included in the conductive resin layer serves to electrically connect the first inner electrode 121 and the second inner electrode 122 or the sintered metal layer.

The conductive metal included in the conductive resin layer may have a spherical shape, a flake shape, or a combination thereof. That is, the conductive metal may be formed only in flake form, only in spherical form, or may be in a mixed form of flake form and spherical form.

Here, the spherical shape may also include a shape that is not a perfect spherical shape, for example, a shape in which the length ratio of the major axis and the minor axis (major axis/minor axis) is 1.45 or less. Flake shape powder refers to a powder with a flat and elongated shape, and is not particularly limited. But for example, the length ratio of the major axis and the minor axis (major axis/minor axis) may be 1.95 or more.

The first external electrode 131 and the second external electrode 132 may further include a plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb), either alone or in an alloy thereof. For example, the plating layer may be a nickel (Ni) plating layer or a tin (Sn) plating layer, may be a form in which the nickel (Ni) plating layer and the tin (Sn) plating layer are sequentially stacked, or may be a form in which the tin (Sn) plating layer, the nickel (Ni) plating layer, and the tin (Sn) plating layer are sequentially stacked. Additionally, the plating layer may include a plurality of nickel (Ni) plating layers and/or a plurality of tin (Sn) plating layers.

The plating layer may improve mountability to the substrate, structural reliability, durability to the outside, heat resistance, and equivalent series resistance (ESR) of the multilayered capacitor 100.

Another embodiment of the present disclosure provides a method of manufacturing a multilayered capacitor, including: forming a dielectric green sheet using dielectric powder; forming a conductive paste layer on the surface of the dielectric green sheet including a compound represented by the following Chemical Formula 1 and having a BET specific surface area of 1.0 to 2.2 $m^2/g$; forming a dielectric green sheet laminate by stacking the dielectric green sheets on which the conductive paste layer is formed; forming a capacitor body including a dielectric layer and an inner electrode by firing the dielectric green sheet laminate in an oxidizing atmosphere; and forming an external electrode on one surface of the capacitor body:

$$M1_{a+1}M2M3_a \qquad \text{[Chemical Formula 1]}$$

(in Chemical Formula 1, M1 is Ti, V, Sc, Zr or Mo, M2 is Al, Si, Sn, Cd, In, Ga, Ge, Pb, As, S or P, M3 is C or N, a is 1 to 3).

Hereinafter, a method of manufacturing a multilayered capacitor according to another embodiment of the present disclosure will be described in more detail.

First, the manufacturing of the capacitor body will be described.

In the manufacturing process of the capacitor body, a dielectric paste that becomes a dielectric layer after firing and a conductive paste that becomes an inner electrode after firing are prepared.

The dielectric paste is manufactured in the following method, for example. The dielectric powder is uniformly mixed by means such as wet mixing, dried, and then heat treated under predetermined conditions to obtain plasticized powder. An organic vehicle or an aqueous vehicle is added to the obtained plasticized powder and kneaded to prepare a dielectric paste.

A dielectric green sheet is obtained by forming the obtained dielectric paste into a sheet using a technique such as the doctor blade method. Additionally, the dielectric paste may contain additives selected from various dispersants, plasticizers, dielectrics, accessory component compounds, or glass, if necessary.

The conductive paste for inner electrodes is prepared by mixing a compound represented by Chemical Formula 1, that is, inner electrode material powder, and a binder or solvent.

At this time, the conductive paste for the inner electrode may not contain nickel (Ni), barium titanate ($BaTiO_3$), silicon dioxide ($SiO_2$), and tungsten (W). In other words, since the multilayered capacitor according to the present disclosure uses the compound of Chemical Formula 1 as an inner electrode material, it may not contain nickel, which is a conventional inner electrode material, and it may not contain a separate additive used to control the sintering shrinkage of nickel. Accordingly, it is possible to prevent deterioration in electrical conductivity due to the use of additives and reduce processing costs.

The conductive paste for inner electrodes is applied to the surface of the dielectric green sheet in a predetermined pattern using various printing methods such as screen printing or transfer methods. Then, a dielectric green sheet laminate is prepared by stacking a plurality of layers of dielectric green sheets on which inner electrode patterns are formed, and then pressing the plurality of layers of dielectric green sheets in the stacking direction. At this time, the dielectric green sheet and the inner electrode pattern may be stacked so that the dielectric green sheet is positioned on the upper and lower surfaces of the dielectric green sheet laminate in the stacking direction.

According to an embodiment of the present disclosure, the obtained dielectric green sheet laminate may be cut to a predetermined size by dicing or the like.

Additionally, the dielectric green sheet laminate may be solidified and dried to remove plasticizers, etc., if necessary, and after solidified and dried, the dielectric green sheet laminate may be barrel polished using a horizontal centrifugal barrel machine, and the like. In barrel polishing, the dielectric green sheet laminate is placed into a barrel container with media and polishing liquid, and rotational motion or vibration is applied to the barrel container, thus unnecessary parts, such as burrs generated during cutting, may be polished. Additionally, after barrel polishing, the dielectric green sheet laminate may be washed with a cleaning solution such as water, and dried.

The capacitor body may be obtained after binder removal and firing of the dielectric green sheet laminate.

The conditions for binder removal may be appropriately adjusted depending on the main component composition of the dielectric layer or the inner electrode. For example, the rate of temperature rise during binder removal treatment may be 5° C./hour to 300° C./hour, the support temperature may be 180° C. to 400° C., and the temperature holding time may be 0.5 hour to 24 hours. The atmosphere of the binder removal may be the air or a reducing atmosphere.

The conditions for the firing may be appropriately adjusted depending on the main component composition of the dielectric layer or the inner electrode. For example, the temperature of the firing may be 1200° C. to 1350° C., or 1220° C. to 1300° C., and the time may be 0.5 hours to 8 hours, or 1 hour to 3 hours.

In particular, the atmosphere of the firing may be an oxidizing atmosphere. Conventionally, when nickel was used as an inner electrode material, firing was performed in a reducing atmosphere. For example, conventionally, firing was performed in an atmosphere in which a mixed gas of nitrogen gas ($N_2$) and hydrogen gas ($H_2$) was humidified and the oxygen partial pressure was controlled to $1.0 \times 10^{-14}$ MPa to $1.0 \times 10^{-10}$ MPa. On the other hand, the multilayered capacitor according to the present disclosure may be performed in an oxidizing atmosphere by using the compound of Chemical Formula 1 as an inner electrode material. Accordingly, there may be an advantage in reducing process costs.

For example, the oxidizing atmosphere may be air or oxygen ($O_2$) atmosphere.

Additionally, the firing may be performed using a hot press method. When using the compound of Chemical Formula 1 as the inner electrode material, it is possible to prevent gas outgassing due to high temperature firing when firing is performed by the hot press method, thereby preventing cracking of the inner electrode.

According to an embodiment of the present disclosure, surface treatment such as sand blasting, laser irradiation, barrel polishing, etc. may be performed on the third and fourth surfaces of the obtained capacitor body. By performing this surface treatment, the ends of the first inner electrode and the second inner electrode may be exposed to the outermost surfaces of the third and fourth surfaces, and thus the electrical connection between the first external electrode and the second external electrode, and the first inner electrode and the second inner electrode may be improved, alloy portions may be easily formed.

A sintered metal layer may be formed on the outer surface of the obtained capacitor body by applying a paste for forming a sintered metal layer with an external electrode, and then sintering the paste.

The paste for forming the sintered metal layer may include a conductive metal and glass. Since the description of the conductive metal and glass is the same as described above, repetitive description will be omitted. In addition, the paste for forming the sintered metal layer may optionally include accessory components such as a binder, solvent, dispersant, plasticizer, or oxide powder. The binder may be, for example, ethylcellulose, acrylic, butyral, etc., and the solvent may be, for example, an organic solvent or aqueous solvent such as terpineol, butylcarbitol, alcohol, methyl ethyl ketone, acetone, toluene, and the like.

Methods for applying the paste for forming the sintered metal layer on the outer surface of the capacitor body may include various printing methods such as dip method and screen-printing, application method using a dispenser, etc., and spraying method using spray. The paste for forming the sintered metal layer may be applied to at least the third and fourth surfaces of the capacitor body, and optionally applied to a part of the first, second, fifth, or sixth surfaces on which the band portions of the first and second external electrodes are formed.

Thereafter, the capacitor body onto which the paste for forming the sintered metal layer is applied is dried and sintered at a temperature of 700° C. to 1000° C. for 0.1 to 3 hours to form the sintered metal layer.

According to an embodiment of the present disclosure, a paste for forming a conductive resin layer may be applied to the outer surface of the obtained capacitor body and then cured to form a conductive resin layer.

The paste for forming the conductive resin layer may include a resin and, optionally, a conductive metal or a non-conductive filler. Since the description of the conductive metal and resin is the same as described above, repetitive description will be omitted. Additionally, the paste for forming the conductive resin layer may optionally include accessory components such as a binder, solvent, dispersant, plasticizer, or oxide powder. The binder may be, for example, ethylcellulose, acrylic, butyral, etc., and the solvent may be an organic solvent or aqueous solvent such as terpineol, butylcarbitol, alcohol, methyl ethyl ketone, acetone, and toluene.

For example, the method of forming the conductive resin layer may be formed by dipping the capacitor body 110 in a paste for forming the conductive resin layer and then curing it, or by printing the paste for forming the conductive resin layer on the surface of the capacitor body 110 by a screen-printing method or a gravure printing method, or by applying the paste for forming the conductive resin layer to the surface of the capacitor body 110 and then curing it.

Next, a plating layer is formed on the outside of the conductive resin layer.

For example, the plating layer may be formed by a plating method, sputtering, or electrolytic plating (electric deposition).

Hereinafter, embodiments of the present disclosure will be described in more detail through examples. However, the following examples are only exemplary examples of the present disclosure and do not limit the scope of appended claims.

Example 1: Preparation of $Ti_3AlC_2$ Inner Electrode Material $Ti_3AlC_2$ powder was manufactured using a solid-state method (ball milling).

Example 2: Preparation of $Ti_2AlC$ Inner Electrode Material $Ti_2AlC$ powder was manufactured using a solid-state method (ball milling).

Example 3: Preparation of $V_2AlC$ Inner Electrode Material $V_2AlC$ powder was manufactured using a solid-state method (ball milling).

Example 4: Preparation of $Ti_3SiC_2$ Inner Electrode Material $Ti_3SiC_2$ powder was manufactured using a solid-state method (ball milling).

Example 5: Preparation of $Ti_3SnC_2$ Inner Electrode Material $Ti_3SnC_2$ powder was manufactured using a solid-state method (ball milling).

Comparative Example 1: Preparation of Ni Inner Electrode Material

Nickel powder (Guangbo Co., Ltd.) was prepared.

Comparative Example 2

$Mo_2GaC$ powder was manufactured using a solid-state method (ball milling).

Comparative Example 3

$Zr_2TiC$ powder was manufactured by a solid-state method (ball milling).

Comparative Example 4

$Cr_2AlC$ powder was manufactured using a solid-state method (ball milling).

Comparative Example 5

$Ta_4AlC_3$ powder was manufactured using a solid-state method (ball milling).

Comparative Example 6

$Nb_4AlC_3$ powder was manufactured using a solid-state method (ball milling).

Comparative Example 7

$Hf_2InC$ powder was prepared by solid-state method (ball milling).

Experiment 1: Evaluation of BET Specific Surface Area of Inner Electrode Materials The specific surface area was measured for the inner electrode material powder, prepared according to the Examples and Comparative Examples, using the BET method (Surface area and Porosity analyzer) (Micromeritics, ASAP2020). The results are shown in Table 1 below.

Experiment 2: Evaluation of High-Temperature Firing Shrinkage Characteristics of Inner Electrode Material In order to evaluate the shrinkage characteristics of the inner electrode material prepared according to the Examples and Comparative Examples when fired at a high temperature, the volume reduction rate according to heat treatment temperature was measured.

More specifically, the volume reduction rate at a temperature of 1100° C. compared to a volume reduction rate at a temperature of 800° C. was measured using thermomechanical analysis (TMA). The results are shown in Table 1 and FIG. 4 below.

Experiment 3: Evaluation of Inner Electrode Material Electrical Conductivity

The electrical conductivity was evaluated for the inner electrode material, prepared according to the Examples and Comparative Examples, and the results are shown in Table 1 below.

More specifically, electrical conductivity was measured using a Four Point Probe meter.

Experiment 4: Density Ratio Evaluation

Density ratio was evaluated for the inner electrode material, prepared according to the Examples and Comparative examples, and the results are shown in Table 1 below.

More specifically, Density Ratio (experimental/theoretical, %) was measured using the Archimedes method.

TABLE 1

| | Type of inner electrode material | BET specific surface area (m²/g) | Volume reduction rate (%) | Electrical conductivity (S/m) | Density ratio (experimental/the oretical, %) |
|---|---|---|---|---|---|
| Example 1 | $Ti_3AlC_2$ | 2.07 | 3.2 | $1.71 \times 10^6$ | 96.3 |
| Example 2 | $Ti_2AlC$ | 1.56 | 4.8 | $1.08 \times 10^6$ | 95.1 |
| Example 3 | $V_2AlC$ | 1.43 | 2.7 | $3.22 \times 10^6$ | 74.2 |
| Example 4 | $Ti_3SiC_2$ | 1.90 | 4.2 | $3.76 \times 10^6$ | 92.1 |
| Example 5 | $Ti_3SnC_2$ | 1.29 | 4.9 | $1.38 \times 10^6$ | 96.3 |
| Comparative Example 1 | Ni | 10.0 | 5.6 | $2.48 \times 10^6$ | 90.7 |
| Comparative Example 2 | $Mo_2GaC$ | 2.3 | 3.2 | $2.65 \times 10^6$ | 70.2 |
| Comparative Example 3 | $Ta_4AlC_3$ | 0.9 | 2.7 | $3.22 \times 10^4$ | 91.2 |

15

Example 3

Referring to Table 1, it can be seen that in Examples 1 to 5, in which the type of inner electrode material compound was appropriately selected and the BET specific surface area was appropriately controlled, the volume reduction rate was relatively small and the electrical conductivity was relatively good. On the contrary, in the case of Comparative Example 1, it can be seen that the electrical conductivity was good, but the volume reduction rate was relatively too large.

In addition, in the case of Comparative Example 2, even though the type of inner electrode material compound was appropriately selected, it can be seen that the BET specific surface area was relatively too large and the density was relatively too small.

In addition, in the case of Comparative Example 3, even though the type of inner electrode material compound was appropriately selected, it can be seen that the BET specific surface area was relatively too small, resulting in low electrical conductivity.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

Therefore, the actual scope of the present disclosure will be defined by the appended claims and their equivalents.

DESCRIPTION OF SYMBOLS

100: Multilayered capacitor
110: Capacitor body
111: Dielectric layer
112, 113: Cover region
121: First inner electrode
122: Second inner electrode
131: First external electrode
132: Second external electrode

What is claimed is:

1. A multilayered capacitor, comprising:
a capacitor body including a dielectric layer and an inner electrode; and
an external electrode disposed outside the capacitor body,
wherein the inner electrode includes a compound represented by the following Chemical Formula 1, and the compound has a Brunauer-Emmett-Teller (BET) specific surface area of 1.0 to 2.2 m²/g:

$$M1_{a+1}M2M3_a \qquad \text{[Chemical Formula 1]}$$

(in Chemical Formula 1, M1 is Ti, V, Sc, Zr or Mo, M2 is Al, Si, Sn, Cd, In, Ga, Ge, Pb, As, S or P, M3 is C or N, a is 1 to 3), and
wherein the compound has an electrical conductivity of $1.05\times10^6$ S/m or more.

2. The multilayered capacitor of claim 1, wherein:
in Chemical Formula 1, M1 is Ti or V, M2 is Al, Si or Sn, and M3 is C.

3. The multilayered capacitor of claim 1, wherein:
the compound is $Ti_3AlC_2$, $Ti_2AlC$, $V_2AlC$, $Ti_3SiC_2$ or $Ti_3SnC_2$.

4. The multilayered capacitor of claim 1, wherein:
the compound has an average particle diameter D50 of 400 to 700 nm.

5. The multilayered capacitor of claim 1, wherein:
the compound has a volume reduction rate of 5% or less at a temperature of 1100° C. compared to a volume reduction rate at a temperature of 800° C. when analyzed by thermomechanical analyzer (TMA).

6. The multilayered capacitor of claim 1, wherein:
the inner electrode does not include nickel (Ni), barium titanate ($BaTiO_3$), silicon dioxide ($SiO_2$), or tungsten (W).

7. The multilayered capacitor of claim 1, wherein:
the dielectric layer includes a plurality of dielectric crystal grains, and the dielectric crystal grains include $BamTiO_3$ ($0.995{\leq}m{\leq}1.010$) as a main component, and hafnium (Hf), manganese (Mn), chromium (Cr), silicon (Si), aluminum (Al), magnesium (Mg), tin (Sn), antimony (Sb), germanium (Ge), gallium (Ga), indium (In), or a combination thereof as an accessory component.

8. A method of manufacturing a multilayered capacitor, comprising:
forming a dielectric green sheet using dielectric powder;
forming a conductive paste layer on a surface of the dielectric green sheet including a compound represented by the following Chemical Formula 1 and having a Brunauer-Emmett-Teller (BET) specific surface area of 1.0 to 2.2 m²/g, $$M1_{a+1}M2M3_a \qquad \text{[Chemical Formula 1]}$$

(in Chemical Formula 1, M1 is Ti, V, Sc, Zr or Mo, M2 is Al, Si, Sn, Cd, In, Ga, Ge, Pb, As, S or P, M3 is C or N, a is 1 to 3);
forming a dielectric green sheet laminate by stacking the dielectric green sheets on which the conductive paste layer is formed;
forming a capacitor body including a dielectric layer and an inner electrode by firing the dielectric green sheet laminate in an oxidizing atmosphere; and
forming an external electrode on one surface of the capacitor body,
wherein the compound has an electrical conductivity of $1.05\times10^6$ S/m or more.

9. The method of manufacturing the multilayered capacitor of claim 8, wherein:
the oxidizing atmosphere is an air or oxygen ($O_2$) atmosphere.

10. The method of manufacturing the multilayered capacitor of claim 8, wherein:
the firing of the dielectric green sheet laminate is performed using a hot press method.

11. The method of manufacturing the multilayered capacitor of claim 8, wherein:
the conductive paste layer does not include nickel (Ni), barium titanate ($BaTiO_3$), silicon dioxide ($SiO_2$), and tungsten (W).

* * * * *